United States Patent [19]
Apelian et al.

[11] Patent Number: 5,234,872
[45] Date of Patent: Aug. 10, 1993

[54] METHOD FOR PRODUCING ZEOLITES WITH REDUCED SURFACE ACIDITY

[75] Inventors: Minas R. Apelian, Vincetown; Thomas F. Degnan, Moorestown, both of N.J.; Anthony S. Fung, Chadds Ford, Pa.

[73] Assignee: Mobil Oil Corp., Fairfax, Va.

[21] Appl. No.: 881,281

[22] Filed: May 11, 1992

[51] Int. Cl.$^5$ .................... B01J 29/06; B01J 37/00
[52] U.S. Cl. ............................. 502/62; 502/85
[58] Field of Search ...................... 502/85, 62

[56] References Cited

U.S. PATENT DOCUMENTS

| | | | |
|---|---|---|---|
| 3,442,795 | 5/1969 | Kerr et al. | 208/120 |
| 4,002,697 | 1/1977 | Chen | 260/671 M |
| 4,088,605 | 5/1978 | Rollmann | 252/465 Z |
| 4,100,215 | 7/1978 | Chen | 260/671 M |
| 4,101,595 | 7/1978 | Chen et al. | 260/668 A |
| 4,388,177 | 6/1983 | Bowes et al. | 208/111 |
| 4,420,418 | 12/1983 | Chu | 502/85 |
| 4,486,616 | 12/1984 | Chu et al. | 502/85 |
| 4,520,221 | 5/1985 | Chen | 585/517 |
| 4,568,786 | 2/1986 | Chen et al. | 585/517 |
| 4,716,135 | 12/1987 | Chen | 502/62 |
| 5,043,307 | 8/1991 | Bowes et al. | 502/86 |
| 5,080,878 | 1/1992 | Bowes et al. | 423/328 |

FOREIGN PATENT DOCUMENTS

0259526B1 9/1991 European Pat. Off. .
0488867A1 6/1992 France .

*Primary Examiner*—Carl F. Dees
*Attorney, Agent, or Firm*—Alexander J. McKillop; Dennis P. Santini; Lori F. Cuomo

[57] ABSTRACT

A process for the selective surface dealumination of organic-containing zeolites by contacting the zeolite with dicarboxylic acid, such as oxalic acid. The treatment results in a reduction in surface acidity without a significant reduction in overall activity. The organic may be a directing agent used in the zeolite synthesis or introduced into the pores of the zeolite after thermal treatment.

28 Claims, No Drawings

5,234,872

METHOD FOR PRODUCING ZEOLITES WITH REDUCED SURFACE ACIDITY

CROSS-REFERENCE TO RELATED APPLICATIONS

This application is related by subject matter to co-pending applications Ser. Nos. 07/828,624 filed Jan. 31, 1992, 07/881,282 filed May 11, 1992 (Mobil Docket 6615) and 07/881,278 filed May 11, 1992.

FIELD OF THE INVENTION

This application is directed to a process for the selective surface dealumination of organic containing-zeolites by contacting with dicarboxylic acid.

BACKGROUND OF THE INVENTION

Zeolitic materials, both natural and synthetic, have been demonstrated to have catalytic properties for various types of hydrocarbon conversion. It is often advantageous to dealuminate these materials in order to improve their process performance. Performance measures include product selectivity, product quality and catalyst stability. Conventional techniques for zeolite dealumination include hydrothermal treatment, mineral acid treatment with HCl, $HNO_3$, and $H_2SO_4$, and chemical treatment with $SiCl_4$ or EDTA. The treatments, however, do not exhibit selectivity to the zeolite crystal surface.

U.S. Pat. No. 3,442,795 to Kerr et al. describes a process for preparing highly siliceous zeolite-type materials from crystalline aluminosilicates by means of a solvolysis, e.g. hydrolysis, followed by a chelation. In this process, the acid form of a zeolite is subjected to hydrolysis, to remove aluminum from the aluminosilicate. The aluminum can then be physically separated from the aluminosilicate by the use of complexing or chelating agents such as ethylenediaminetetraacetic acid or carboxylic acid, to form aluminum complexes that are readily removable from the aluminosilicate. The examples are directed to the use of EDTA to remove alumina.

EP 0 259 526 B1 discloses the use of dealumination in producing ECR-17. The preferred dealumination method involves a combination of steam treatment and acid leaching, or chemical treatments with silicon halides. The acid used is preferably a mineral acid, such as HCl, $HNO_3$ or $H_2SO_4$, but may also be weaker acids such as formic, acetic, citric, oxalic, tartaric acids and the like.

U.S. Pat. No. 4,388,177 discloses modifying the shape selectivity of natural ferrierite by treating with oxalic acid to impart catalytic activity.

U.S. Pat. No. 4,088,605 discloses a crystalline aluminosilicate zeolite containing an aluminum-free outer shell prepared by initiating the crystallization in a crystallization medium and then altering the crystallization medium to eliminate the aluminum therein. This can be accomplished by a total replacement of the reaction mixture or by complexing from the original reaction mixture any remaining aluminum ion with reagents such as gluconic acid, tartaric acid, nitrilotriacetic acid or EDTA.

Non-selective reactions on the surface acid sites of the zeolite are generally undesirable. These non-selective reactions often lead to lower product yield and/or inferior product characteristics. To minimize the incidence of undesirable reactions occurring on the surface of the zeolite catalyst methods have been used to reduce or eliminate surface acidity by extraction with bulky reagents or by surface poisoning.

Zeolite modification by exchange and similar technology with large cations such as $N^+$ and $P^+$ and large branched compounds such as polyamines and the like is described in U.S. Pat. No. 4,101,595. Bulky phenolic and silicating zeolite surface modifying agents are described in U.S. Pat. Nos. 4,100,215 and 4,002,697, respectively. The surface acidity of the zeolite can be eliminated or reduced by treatment with bulky dialkylamine reagents as described in U.S. Pat. Nos. 4,520,221 and 4,568,786.

U.S Pat. No. 4,716,135 discloses zeolite catalysts can be surface inactivated by cofeeding a sterically hindered base organophosphorus compound. U.S. Pat. No. 5,080,878 discloses modifying a crystalline aluminosilicate zeolite with a fluorosilicate salt to extract surface zeolite aluminum which is replaced by silicon. U.S. Pat. No. 5,043,307 discloses modifying a crystalline aluminosilicate zeolite by steaming as synthesized zeolite containing organic template material and then contacting the zeolite in the ammonium, alkali metal, or hydrogen form with a dealuminizing agent which forms a water soluble complex with aluminum. These methods, however, often increase the complexity and operability of the process.

Therefore, it is an object of the present invention to provide a process for surface selective dealumination of crystalline aluminosilicate zeolites. It is a further object of the present invention to minimize non-selective reactions on the surface acid sites of the crystalline aluminosilicate zeolites. It is a further object of the present invention to improve process performance of crystalline aluminosilicate zeolites.

SUMMARY OF THE INVENTION

Limiting surface acidity is desirable for preventing undesired reactions on the zeolite surface which are not subject to the shape selective constraints imposed on those reactions occurring within the zeolite interior. However reducing the surface acidity will generally effect a reduction in overall activity of the zeolite. The present invention relates to dicarboxylic acid treatment of organic containing zeolites resulting in a reduction in surface acidity without a significant reduction in overall activity.

The invention therefore includes a process for the selective surface dealumination of an organic-containing zeolite comprising contacting said zeolite with dicarboxylic acid for a sufficient time to effect at least about a 25% reduction in surface acidity with less than about 50% overall dealumination.

DETAILED DESCRIPTION OF THE INVENTION

The process of the invention is useful for the selective surface dealumination of as synthesized zeolites or uncalcined inorganic oxide bound zeolites which contain organic species, such as organic directing agents. The presence of the organic in the pores of the zeolite is believed to facilitate surface selective dealumination for zeolites having a wide range of Constraint Indicies.

The method by which Constraint Index is determined is described fully in U.S. Pat. No. 4,016,218, incorporated herein by reference for details of the method. Constraint Index (CI) values for some typical zeolites including some which are suitable in the process of this invention are:

| | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316 C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| MCM-22 | 1.5 (454° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites in which the dicarboxylic acid treatment of the present invention to selectively dealuminate the surface of zeolites is effective. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of binder material. Similarly, other variables such as crystal size of the zeolite, the presence of occluded contaminants, etc., may affect the observed Constraint Index value. It will therefore be appreciated that it may be possible to select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites but that such are the cumulative result of several variables useful in the determination and calculation thereof. Thus, for a given zeolite exhibiting a CI value within the range of 5 or less, depending on the temperature employed during the test method within the range of 290° C. to about 538° C., with accompanying conversion between 10% and 60%, the CI may vary within the indicated range of 5 or less. Accordingly, it will be understood to those skilled in the art that the CI as utilized herein, while affording a highly useful means for characterizing the zeolites of interest, is approximate taking into consideration the manner of its determination including the possibility in some instances of compounding variable extremes. However, in all instances, at a temperature within the above-specified range of 290° C. to about 538° C., the CI will have a value for any given zeolite of interest herein of not greater than about 5 and preferably not greater than about 3.

Some zeolite catalysts which are useful in the process of this invention include zeolites such as zeolite Beta, mordenite, ZSM-20, zeolite Y, zeolite X, ZSM-4, faujasite and ZSM-5.

The presence of the organic within the zeolite pores facilitates surface selective dealumination because it precludes the acid from entering the pores. Preferably, the zeolite contains at least about 5 wt. %, and more preferably at least about 10 wt. %, of an organic material that can be decomposed or desorbed at temperatures in the range of about 700° to about 1000° F.

The zeolites may contain organic directing agents. Suitable organic directing agents include n-propylamine cations, n-butylamine cations, n-ethylamine cations, tetraethylammonium cations, tetrapropylammonium cations, pyridine, alkyl substituted pyridines and organic phosphites.

Lok et al. (3 *Zeolites*, 282–291(1983)), incorporated herein by reference, teach numerous organic compounds which act as directing agents in zeolite synthesis including tetramethylammonium cation and other quarternary ammonium ions, organic amines and other organic molecules, such as alcohols, ketones, morpholine, glycerol and organic sulfur is also disclosed.

Zeolites synthesized in the absence of of an organic directing agent, such as faujasite and some types of ZSM-5, can also be modified after thermal treatment by introducing organic species into the pores of the zeolite. These organic molecules include cyclohexane, hexane and n-propylamine cations, n-butylamine cations, n-ethylamine cations, tetraethylammonium cations, tetrapropylammonium cations, pyridine, alkyl substituted pyridines and organic phosphites. Other molecules that can occupy the internal pores of the zeolite can also be used. The presence of the organic species within the pores of the zeolite promotes surface dealumination. The organic species can be introduced by sorption, exchange or impregnation.

Prior to or following the selective surface dealumination process of the present invention, it may be desirable to incorporate the zeolites with another material resistant to the temperature and other conditions employed in the process. Such matrix materials include synthetic or natural substances as well as inorganic materials such as clay, silica and/or metal oxides, such as titania or zirconia. The latter may be either naturally occurring or in the form of gelatinous precipitates or gels including mixtures of silica and metal oxides. Naturally occurring clays which can be composited with the zeolite include those of the montmorillonite and kaolin families. These clays can be used in the raw state as originally mined or initially subjected to calcination, acid treatment or chemical modification. These materials, i.e. clays, oxides, etc., function, in part, as binders for the catalyst.

In addition to the foregoing materials, the zeolites may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel. The relative proportions of zeolite component and inorganic oxide gel matrix may vary widely with the zeolite content ranging from between 1 to 99, more usually 5 to 80, percent by weight of the composite.

Suitable dicarboxylic acids for use in the process of this invention include oxalic, malonic, succinic, glutaric, adipic, maleic, phthalic, isophthalic, terephthalic, fumaric, tartaric or mixtures thereof. Oxalic acid is preferred. The dicarboxylic acid may be used in solution, such as an aqueous dicarboxylic acid solution.

Generally, the acid solution has a concentration in the range from about 0.01 to about 4M. Preferably, the acid solution concentration is in the range from about 1 to about 3M.

The dicarboxylic acid is generally in a volume solution to volume catalyst ratio of at least about 1:1, preferably at least about 4:1.

Treatment time with the dicarboxylic acid solution is as long as required to provide the desired dealumination. Generally the treatment time is at least about 10 minutes. Preferably, the treatment time is at least about 1 hour.

The treatment temperature is generally in the range from about 32° F. to about reflux. Preferably, the treatment temperature is from about 60° F. to about 200° F., and more preferably from about 120° F. to about 180° F.

More than one dicarboxylic acid treatment step may be employed in the process of the present invention for enhanced surface dealumination.

The dicarboxylic acid treatment of this invention may also be combined with other conventional dealumination techniques, such as steaming and chemical treatment. Steaming is preferred prior to treatment with dicarboxylic acid, and more preferred prior to incorporation of the organic. Chemical treatment is preferred following treatment with dicarboxylic acid.

The dicarboxylic acid selectively dealuminates the surface acid sites of organic containing-zeolites. The presence of surface acid sites, or surface acidity, is determined by the dealkylation of tri-tertbutylbenzene (TTBB), a bulky molecule that can only react with the acid sites on the zeolite crystal surface.

Dealkylation of TTBB is a facile, reproducible method for measuring surface acidity of catalysts. External surface activity can be measured exclusive of internal activity for zeolites with pore diameters up to and including faujasite. As a test reaction dealkylation of TTBB occurs at a constant temperature in the range of from about 25° to about 300° C., and preferably in the range of from about 200° to about 260° C.

The experimental conditions for the test used herein include a temperature of 200° C. and atmospheric pressure. The dealkylation of TTBB is carried out in a glass reactor (18 cm×1 cm OD) containing an 8 gm 14/30 mesh Vycor chip preheater followed by 0.1 gm catalyst powder mixed with Vycor chips. The reactor is heated to 200° C. in 30 cc/gm nitrogen for 30 minutes to remove impurities from the catalyst sample. Ten gm/hr of TTBB dissolved in toluene (7% TTBB) is injected into the reactor. The feed vaporizes as it passes through the preheater and is vapor when passing over the catalyst sample. After equilibrium is reached the nitrogen is switched to 20 cc/min hydrogen. The test is then run for about 30 minutes with the reaction products collected in a cold trap.

The reaction products are analyzed by gas chromatography. The major dealkylation product is di-t-butylbenzene (DTBB). Further dealkylation to t-butylbenzene (TBB) and benzene (B) occurs but to a lesser extent.

Conversion of TTBB is calculated on a molar carbon basis. Dealkylation product weight % are each multiplied by the appropriate carbon number ratio to convert to the equivalent amount of TTBB, i.e. DTBB×18/14, TBB×18/10 and B×18/6. These values are then used in the following conversion equation where asterisks indicate adjustment to the equivalence.

$$\% \text{ Conversion} = \frac{DTBB^* + TBB^* + B^*}{TTBB + DTBB^* + TBB^* + B^*}$$

In addition, thermal background experiments using reactors filled with vycor chips only show no TTBB conversion due to Vycor chips or other reactor components.

In a further embodiment a first order rate constant may be calculated using the following equation:

$$k_1 = \frac{\text{Catalyst Density (g/cc)} \times \text{Gas Flow (cc/min)}}{60 \text{ sec/min} \times \text{Catalyst Weight (g)}} \ln(1 - \epsilon)$$

where catalyst density is the bulk density and $\epsilon$ is the fractional conversion at 60 minutes time on stream. For bound catalysts, the catalyst weight is the weight of the zeolite component.

The dicarboxylic acid treatment of this invention results in selective surface dealumination, with essentially no loss in crystallinity. Crystallinity, as described herein is a measure of the difference in cyclohexane sorption between the calcined untreated material and the calcined material after treatment with dicarboxylic acid.

The dicarboxylic acid treatment of this invention results in less than about 50% overall dealumination, preferably less than about 20% overall dealumination, and more preferably less than about 10% overall dealumination with greater than about 25% reduction in surface acidity, preferably greater than about 40% reduction in surface acidity, and more preferably greater than about 45% reduction in surface acidity.

The following examples illustrate the process of the present invention.

EXAMPLE 1

A sample of zeolite Beta is synthesized in accordance with U.S. Pat. No. 3,308,069 and U.S. Pat. No. Re. 28,341, incorporated herein by reference, using a tetraethylammonium (TEA) directing agent, and having a Constraint Index of 0.6. The as synthesized TEA containing zeolite Beta henceforth referred to as Catalyst A has the following properties:

| | |
|---|---|
| $Al_2O_3$, wt % | 4.6 |
| Cyclohexane Sorption, wt % | 21 |

EXAMPLE 2

A sample of Catalyst A as set forth in Example 1 is calcined to remove organics by first treating in $N_2$ at 950° F. for 3 hours followed by treating in air at 1000° F. for 6 hours. The resulting catalyst henceforth referred to as Catalyst B has the following properties:

| | |
|---|---|
| $Al_2O_3$, wt % | 4.6 |
| Cyclohexane Sorption capacity, wt % | 21 |
| Surface Acidity, % conversion | 64.5 |

EXAMPLE 3

A sample of Catalyst A as set forth in Example 1 is treated with a 2M solution of oxalic acid at 160° F. for 1 hour. The catalyst is rinsed with hot water and the oxalic acid treatment is repeated. The sample is dried at 250° F. for 8 hours. The TEA is then removed from the zeolite by first treating in $N_2$ at 950° F. for 3 hours followed by treating in air at 1000° F. for 6 hours. The treatment results in 7% overall dealumination with a 49% reduction in surface acidity as measured by % conversion (calculated using surface acidity of calcined Catalyst B for reference). The oxalic acid treated catalyst has the following properties:

| $Al_2O_3$, wt % | 4.3 |
|---|---|
| Cyclohexane sorption, wt % | 21 |
| Surface Acidity, % conversion | 32.8 |

EXAMPLE 4

This is a comparative example which demonstrates the dealumination of a large pore zeolite, such as zeolite Beta is non-selective to the crystal surface in the absence of the organic.

A sample of Catalyst B as set forth in Example 2 is treated with 2M oxalic acid at 160° F. for 1 hour. The treated sample is washed with water, dried and calcined at 100° F. for 8 hours. The treatment results in 91% overall dealumination with a corresponding 82% reduction in surface acidity as measured by % conversion. The oxalic acid treated catalyst has the following properties:

| $Al_2O_3$, wt % | 0.40 |
|---|---|
| Cyclohexane sorption, wt % | 20 |
| Surface Acidity, % conversion | 11.6 |

Changes and modifications in the specifically described embodiments can be carried out without departing from the scope of the invention which is intended to be limited only by the scope of the appended claims.

What is claimed:

1. A process for the selective surface dealumination of an organic-containing zeolite comprising contacting said zeolite with dicarboxylic acid for a sufficient time to effect at least about a 25% reduction in surface acidity with less than about 50% overall dealumination.

2. The process of claim 1 wherein said reduction in surface acidity is determined by dealkylation of tri-tert-butylbenzene.

3. The process of claim 1 wherein said organic-containing zeolite contains at least about 5 wt % of an organic material.

4. The process of claim 3 wherein said organic-containing zeolite contains at least about 10 wt % of an organic material.

5. The process of claim 1 wherein said organic is a directing agent used in synthesis of said organic-containing zeolite.

6. The process of claim 1 wherein said organic-containing zeolite is synthesized in the absence of an organic directing agent, said organic being introduced after thermal treatment.

7. The process of claim 1 wherein said organic is selected from the group consisting of n-propylamine cations, n-butylamine cations, n-ethylamine cations, tetraethylammonium cations, tetrapropylammonium cations, pyridine, alkyl substituted pyridines and organic phosphites.

8. The process of claim 1 wherein said organic-containing zeolite is selected from the group consisting of zeolite Beta, mordenite, zeolite Y, ZSM-20, ZSM-4, faujasite and ZSM-5.

9. The process of claim 1 wherein said organic-containing zeolite is unbound.

10. The process of claim 1 wherein said organic-containing zeolite is bound with an inorganic oxide binder prior to said selective surface dealumination.

11. The process of claim 1 wherein said surface acidity is reduced by at least about 40%.

12. The process of claim 1 wherein said surface acidity is reduced by at least about 45%.

13. The process of claim 1 wherein said overall dealumination is less than about 20%.

14. The process of claim 1 wherein said overall dealumination is less than about 10%.

15. The process of claim 1 wherein said dicarboxylic acid is in solution.

16. The process of claim 15 wherein said solution of dicarboxylic acid is at a volume ratio of solution to catalyst of at least about 1:1.

17. The process of claim 1 wherein said dicarboxylic acid is an aqueous dicarboxylic acid solution.

18. The process of claim 1 wherein said dicarboxylic acid is in a concentration in the range of from about 0.01 to about 4M.

19. The process of claim 1 wherein said dicarboxylic acid is selected from the group consisting of oxalic, malonic, succinic, glutaric, adipic, maleic, phthalic, isophthalic, terephthalic, fumaric, tartaric and mixtures thereof.

20. The process of claim 1 wherein said dicarboxylic acid is oxalic acid.

21. The process of claim 1 wherein said contacting is for a time of at least about 10 minutes.

22. The process of claim 1 wherein said contacting is at a temperature in the range of from about 60° F. to about 200° F.

23. A process for the selective surface dealumination of a zeolite containing at least about 5 wt % of an organic material comprising contacting the zeolite with oxalic acid for a sufficient time to effect at least about a 25% reduction in surface acidity with less than about 50% overall dealumination.

24. The product of the process by claim 1.

25. The product of the process by claim 23.

26. A process for the selective surface dealumination of an organic-containing zeolite comprising contacting said zeolite with dicarboxylic acid for a time in the range of about 10 minutes to about 1 hour to effect at least about a 25% reduction in surface acidity with less than about 50% overall dealumination.

27. A process for the selective surface dealumination of an organic-containing zeolite Beta comprising contacting said zeolite Beta with dicarboxylic acid for a sufficient time to effect at least about a 25% reduction in surface acidity with less than about 50% overall dealumination.

28. The zeolite Beta produced by the process of claim 27.

* * * * *